E. P. COFFEY.
RIM TOOL.
APPLICATION FILED NOV. 21, 1921.
1,430,058.
Patented Sept. 26, 1922.
2 SHEETS—SHEET 2.
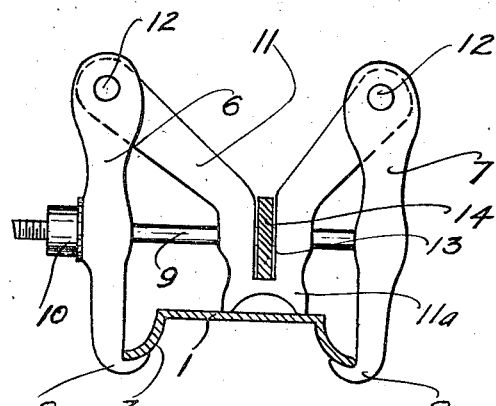
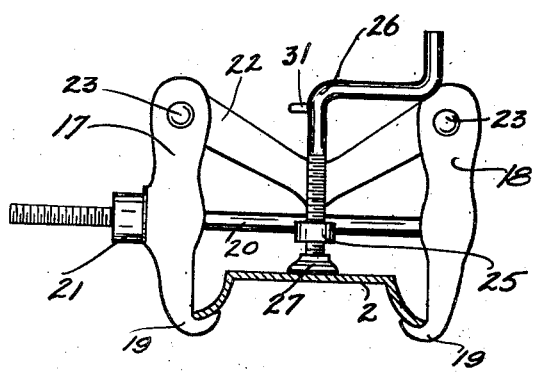
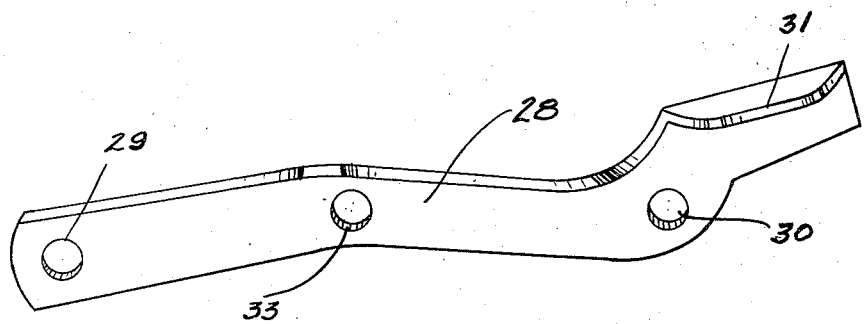
Inventor
Edward P. Coffey
By Herbert E. Smith
Attorney Patented Sept. 26, 1922.

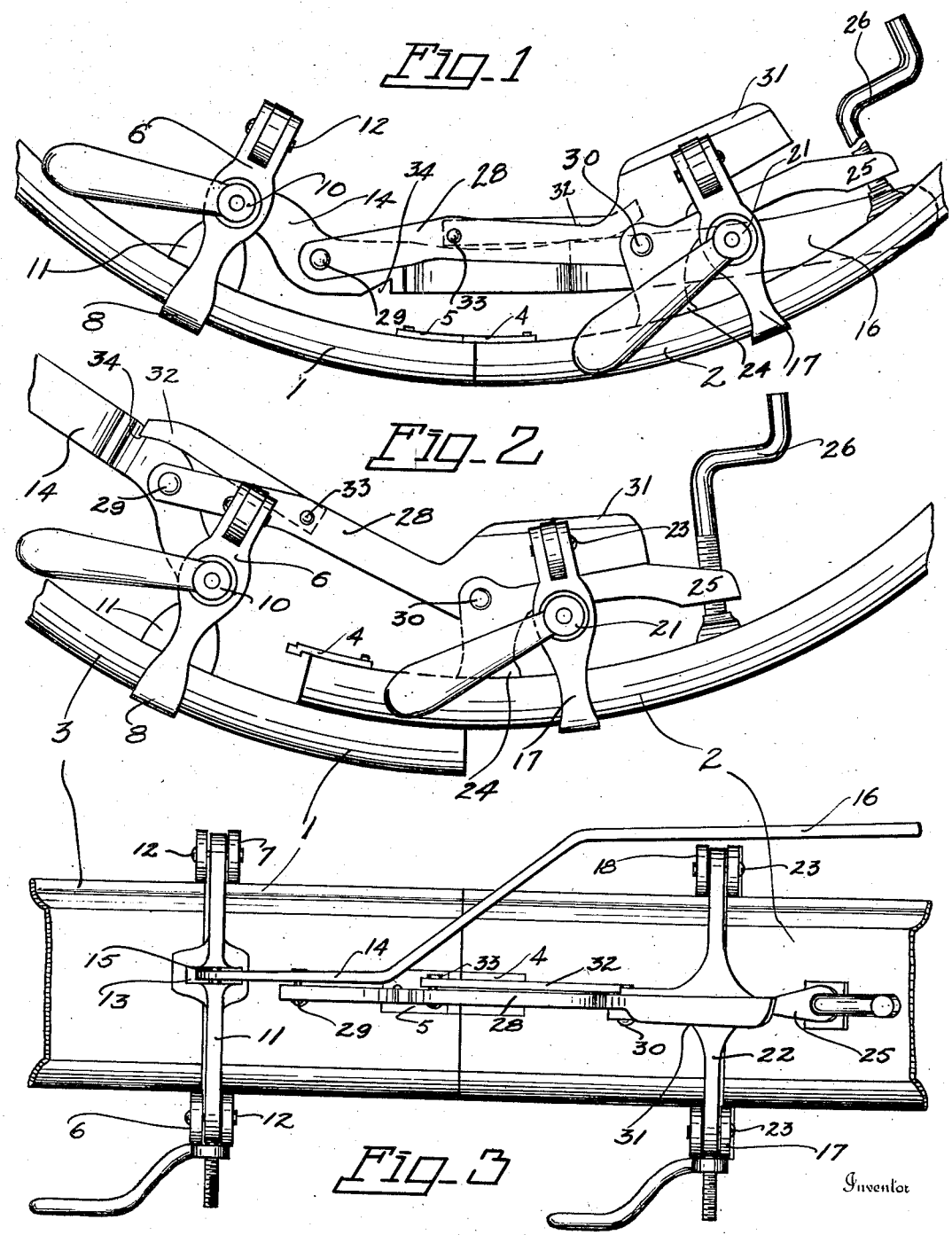

1,430,058

UNITED STATES PATENT OFFICE.

EDWARD P. COFFEY, OF SPOKANE, WASHINGTON.

RIM TOOL.

Application filed November 21, 1921. Serial No. 516,606.

*To all whom it may concern:*

Be it known that I, EDWARD P. COFFEY, a citizen of the United States, residing at Spokane, in Spokane County and State of Washington, have invented certain new and useful Improvements in Rim Tools, of which the following is a specification.

My present invention relates to improvements in rim tools for use in removing tire casings from demountable rims of automobile wheels, wherein the adjoining ends of the split rim are adapted to be pulled out of alinement and brought to overlapping position for the purpose of reducing the diameter of the rim. By the utilization of the subject matter of my invention the device is especially adapted for separating adjoining ends of rims that are locked with a tongue and slot device, by first pulling one end inwardly to disengage the locked parts in order that the tool may subsequently bring the ends to overlapping position, and means are provided for retaining the tool with the overlapped ends in this position.

The invention consists in a facile implement or tool that is comparatively simple in construction and operation, may readily be attached to the split rim for use, and may with equal facility be disengaged therefrom, and the novel combinations and arrangements of parts forming the subject matter of my invention are set forth in the appended claims.

In the accompanying drawings I have illustrated one complete example of the physical embodiment of my invention, wherein the parts are combined and arranged according to the best mode I have thus far devised for the practical application of the principles of my invention.

Figure 1 is a view in side elevation of the tire tool, applied to a wheel rim and ready for use.

Figure 2 is a similar view, after the adjoining ends of the transversely split rim have been moved to overlapping position.

Figure 3 is a plan view of the tool as in Figure 1.

Figure 4 is a transverse sectional view looking from the right near the left end of the device in Figure 1.

Figure 5 is an end view looking from the right in Figure 1.

Figure 6 is a perspective view of the draw link.

In the preferred form of the invention as illustrated in the drawings I have shown the ends 1 and 2 of a transversely split wheel rim, provided with the usual side flanges 3, and of that type employing a locking lug 4 on one end to engage a complementary slotted plate 5 on the adjoining end of the rim, for retaining the ends in alined position.

The tool is designed to, first, pull inwardly one of the ends as 2, and then draw the ends past one another as in Fig. 2 to reduce the diameter of the rim, and thus permit withdrawal of the tire case. Two clamps are employed for attaching the tool to the rim ends, one of the clamps comprising a pair of opposed jaws 6 and 7 each provided with a hook 8. These jaws are applied at the inner side of the rim, and the hook on each jaw is adapted to engage over the flanges of the rim as shown in Fig. 4. By means of a transverse clamp bar 9 threaded to accommodate the clamp nut 10, the jaws are clamped on the rim, from the outer edges thereof. These jaws, at one end, are supported from a yoke 11 by pivots 12, and the yoke forms an intermediate element for engaging the inner face of the rim, the diverging arms of the yoke and the two jaws, when hooked on the flanges, forming a rigid support for one end of the rim tool.

The yoke is provided with a notch or socket 13, offset from the center of the rim, to accommodate the operating lever 14, which is pivoted at 15 in the yoke and provided with a handle 16. The handle is preferably offset, somewhat, to facilitate manipulation of the lever, and the lever may be swung from initial position of Figure 1, on its pivot 15, to position of Figure 2 for separating the ends 1 and 2 of the rim.

A second clamp device is utilized, for anchoring the tool to the end 2 of the rim, and this clamp device also includes a pair of jaws 17 and 18 having hooks 19 to engage the flanges 3 of the rim. These jaws are also joined by a clamp bar 20 having a clamp nut 21 on its threaded end, and the jaws are supported from the diverging arms of a yoke 22 by pivots 23. The contact head 24 of the yoke is adapted to bear against the inner face of the rim, and by means of the nut and clamp bar 20 the yoke 22, jaws 17 and 18 and their hooks form a rigid support and attachment for the tool on the end 2 of the rim. For adapting the tool to various sizes of rims I utilize a perforated arm 25 formed as an extension of the yoke 22, in which the screw bar 26 may be turned to frictionally engage its head 27 against the inner surface of the rim, thus aiding in providing a rigid support on the end 2 for the tool.

A draw link 28 is suspended between the spaced clamps or supports, and at 29 is pivoted to the operating lever while at 30 this link is pivoted to the yoke 22. A flange 31 is formed at the end of the link upon which the foot may be placed to stabilize the movement of the link when the lever 14 is operated or swung on its pivot. A latch 32 is pivoted at 33 on the link and adapted to be swung over on its pivot to engage in a notch 34 provided therefor in the edge of the operating lever as shown.

In applying the tool for use, the two sets of clamping jaws and their respective yokes are first applied to the rim ends as shown in Figure 1, with the heads 11$^a$ and 24 of the yokes engaging the rim ends, and the hooks of the respective jaws engaging the rim flanges to form a rigid and secure support for the tool. By turning the screw bar 26, the yoke 22, of which the head 24 is offset at one side of the jaws 17—18, is brought into rigid relation with the rim end, and the support to which the pull of lever 14 is applied is thus attached at four points to the rim to afford a rigid and secure hold.

It will be noted that the pivot 29 of the draw link on the lever 14 is below the plane of a line drawn from the pivot 15 of the lever and the point 30 for the application of power of the lever to the rim end 2. Thus when the lever is first pulled upwardly and swung on its pivot, the point 29 describes an arc of a circle with the pivot 15 as the fulcrum. Consequently the initial movement of the end 2 is in a radial direction, toward the center of the rim, and the end 2 is thus moved inwardly past the end 1, freeing the latch 4 from its plate 5 on the respective rim ends. A continued swinging movement of the lever, now draws the end 2 of the rim, through the draw link, and yoke 22 over to the left as in Figure 2, with the end 2 overlapping the end 1 of the rim, reducing the diameter of the rim and permitting withdrawal of the tire. After the ends of the rim have been brought to overlapping position the latch 32 may be swung on its pivot 33 and the free end of the latch engaged in the notch 34 of the lever, to hold the lever open and the two rim ends in rigid position. In restoring the rim ends to normal position, the latch 32 is freed, and the lever swung back to position of Figure 1, the parts being held in proper alinement in order that the latch 4 will readily engage with its slotted plate 5 and restore the rim ends to locked position. Foot pressure may be applied to the flange 31 of the draw link in order to secure facile leverage in returning or resetting the rim ends.

Having thus fully described my invention, what I claim as new and desire to secure by Letters Patent is:—

1. The combination in a tool as described of a yoke having a bearing head to engage one end of a split rim, a pair of clamping jaws pivoted on said yoke to engage the rim flanges, a perforated arm on the yoke and a screw bar therein to engage the rim, a second clamp device adapted to engage an adjoining rim-end, an operating lever pivoted on the latter device, and a draw link pivotally connecting said lever and yoke.

2. The combination with a clamp device comprising a transversely disposed yoke adapted to engage one end of a split rim, a pair of jaws pivoted on said yoke and adapted to engage the rim flanges and means for clamping said jaws, of a second clamp device comprising a yoke to engage the adjoining end of said rim, a pair of jaws pivoted on the second yoke to engage the rim flanges and means for clamping said jaws, a perforated arm on the second yoke and a screw bar therein to engage the rim, an operating lever pivoted in the first yoke, and a draw link pivotally connecting said lever and the second yoke.

In testimony whereof I affix my signature.

EDWARD P. COFFEY.